United States Patent [19]
Schöttker et al.

[11] Patent Number: 5,335,398
[45] Date of Patent: Aug. 9, 1994

[54] DEVICE FOR SEALING THE END OF A HEAT-SHRUNK SLEEVE

[75] Inventors: Reinhard Schöttker, Lauenhagen; Franz Grajewski, Stadthagen, both of Fed. Rep. of Germany

[73] Assignee: Kabelmetal electro GmbH, Fed. Rep. of Germany

[21] Appl. No.: 955,518

[22] Filed: Oct. 2, 1992

[30] Foreign Application Priority Data

Oct. 4, 1991 [DE] Fed. Rep. of Germany ....... 4132961

[51] Int. Cl.⁵ ............................................. H02G 15/08
[52] U.S. Cl. ............................................................. 24/528
[58] Field of Search ............................ 24/522, 527, 528

[56] References Cited

U.S. PATENT DOCUMENTS

| | | | |
|---|---|---|---|
| 933,311 | 9/1909 | Klein | 24/527 X |
| 1,760,346 | 5/1930 | Correa | 24/527 X |
| 3,379,218 | 4/1968 | Conde. | |
| 3,455,336 | 7/1969 | Ellis. | |
| 3,510,923 | 5/1970 | Blake. | |
| 4,085,286 | 4/1978 | Horsma et al. | |
| 4,123,047 | 10/1978 | Koht et al. | |
| 4,298,415 | 11/1981 | Nolf. | |
| 4,344,909 | 8/1982 | De Blauwe. | |
| 4,400,579 | 8/1983 | Nolf. | |
| 4,410,379 | 10/1983 | Franckx. | |
| 4,490,426 | 12/1984 | Franckx. | |
| 4,560,828 | 12/1985 | Franckx et al. | |
| 4,625,073 | 11/1986 | Breesch et al. | |
| 4,641,009 | 2/1987 | Vansant et al. | |
| 4,641,402 | 2/1987 | Vansant et al. | |
| 4,648,924 | 3/1987 | Nolf. | |
| 4,680,065 | 7/1987 | Vansant et al. | |
| 4,689,474 | 8/1987 | Overbergh et al. | |
| 4,734,543 | 3/1988 | Nolf. | |
| 4,860,799 | 8/1989 | Van Noten. | |

FOREIGN PATENT DOCUMENTS

| | | |
|---|---|---|
| 2413623 | 2/1975 | Fed. Rep. of Germany. |
| 9100359 | 1/1991 | Fed. Rep. of Germany. |
| 9100979 | 5/1991 | Fed. Rep. of Germany. |
| 3932747 | 11/1991 | Fed. Rep. of Germany. |
| 2218671 | 9/1974 | France. |
| 387438 | 5/1965 | Switzerland. |
| 1451416 | 10/1976 | United Kingdom. |

OTHER PUBLICATIONS

Raychem Thermofit ATUM Dual Wall Heat Shrinkable Tubing.
Raychem Telecom Product Directory; 1989.
Raychem Corporation's article entitled: Thermofit Tubing Splice Encapsulation Directions; 1968.
XAGA 250 Distribution Splice Closure System.
Raychem Telecom Product Directory 1990–1991.
Kabelmetal Electro Pexolan ® Products.
XAGA 1600 Buried Splice Closure Polyurethane Encapsulated Method.

*Primary Examiner*—James R. Brittain
*Attorney, Agent, or Firm*—Ware, Fressola, Van Der Sluys & Adolphson

[57] ABSTRACT

A device for sealing the end of a heat-shrunk sleeve surrounding a branching connection of electrical or optical cables grips the outer surface of the sleeve between the branching cables and keeps the opposing surfaces of the sleeve in contact with each other between the cables, during cooling after the heat-shrinking of the sleeve. The device has two parallel arms which are interlocked with each other at one end. The distance between the arms can be changed in such a way, that the arms remain essentially parallel at any distance from each other. The device is preferably installed after heat-shrinking.

15 Claims, 2 Drawing Sheets

DEVICE FOR SEALING THE END OF A HEAT-SHRUNK SLEEVE

BACKGROUND OF THE INVENTION

1. Technical Field

The invention concerns a device for sealing a heat-shrunk sleeve and, more particularly, for sealing the end of a heat-shrunk sleeve surrounding a branch connection of electrical or optical cables.

2. Description of the Prior Art

A 1968 pamphlet by the Raychem Company entitled "Thermofit Tubing Splice Encapsulation Directions" introduces a technique, whereby two cables are inserted into one end of a heat-shrinkable sleeve. The inside surface of the heat-shrinkable sleeve is coated with hot-melt adhesive. While the sleeve is hot, the area of the sleeve between the two cables is held together with a pliers-type tool. The hot-melt adhesive liquefies during shrinking, and is pressed into the empty spaces by the shrinking sleeve. Excess hot-melt adhesive emerges from the end of the sleeve. The tool can be removed after the branch arrangement cools. The cooled hot-melt adhesive keeps the opposing areas between the cables together and seals the inlet area. The shape of the pliers-type tool is disclosed as needle-nosed.

Instead of the pliers-type tool, it is known from U.S. Pat. No. 4,298,415 to insert a clamp from the end of the sleeve to the inlet area of the sleeve between the cables. A clamp with three legs is used in a preferred configuration, where one of the legs is placed inside the sleeve and the other two are located outside of the sleeve. The leg on the inside of the sleeve is coated with hot-melt adhesive. During heat-shrinking, the heat is transferred by the metal clamp to the inside of the sleeve, where it liquefies the hot-melt adhesive. This the metal clamp to the inside of the sleeve, where it liquefies the hot-melt adhesive. This technique has been used in the production of communications cable sleeves. Installing this known clamp becomes especially difficult when the end of the sleeve is not readily accessible. Furthermore, the installer needs both hands, because the clamp installation requires squeezing the inlet area together. Certain precautions must be taken to prevent the clamp from coming off during heat-shrinking of the sleeve, which increases the manufacturing costs of the clamp. Thus, it is known to provide the clamp with a saw tooth profile and to manufacture the clamp from a heat-releasing metal alloy.

SUMMARY OF THE INVENTION

An object of the present invention is to improve the prior art devices, to permit installation of the device after heat-shrinking, and to prevent the device from coming off the sleeve during the heat-shrinking process.

The device of the present invention is attached to the outer surface of the sleeve between the branching cables, and keeps opposing surface areas of the sleeve in contact with each other between the cables during cooling, after they were heated to shrink the sleeve. The device has two parallel arms that are interlocked with each other to form a closure at one end.

The distance between the arms can be changed, so that the arms remain essentially parallel at any distance from each other.

The device according to the invention can be attached to the end of the sleeve after heat-shrinking. The arms of the device can subsequently be brought closer to each other, which causes the opposing areas of the sleeve to make contact with each other. The still liquid hot-melt adhesive is pressed by the force of the arms to fill any remaining empty spaces. Excess adhesive emerges from the end of the sleeve.

However, it is also possible to attach the device to the area of the sleeve in question before heat-shrinking. Here as well, the distance between the arms is reduced after the attachment, until both arms touch the outside of the sleeve. The opposing areas are held together during heat-shrinking, and any excess liquid hot-melt adhesive emerges from the end of the sleeve.

The device of the present invention is composed of first and second parts. The parts can be assembled at the factory or at the installation site. Both the first and second parts have an arm, a head portion at the end of the arm and a connector protruding from the head portion. Preferably, the connectors extend perpendicular to the arms. The parts of the device are assembled by means of the connectors, which positively lock to each other. The positive lock connection of the parts is achieved with the use of catch elements.

The connector of the first part has two beams forming a gap between them, while the connector of the second part has a beam inside the gap. Recesses are provided in the head portion of the second part on both sides of its beam and the beam ends of the first part extend into the recesses.

The head portion of the first part has a corresponding recess, in which the beam end of the second part is located. The recesses in the first and second parts guide the parts during assembly.

The recess of the first part has catch elements, which grip corresponding catch elements on the outside of the beam of the second part. The catch elements set the distance between the arms of the first and second parts. There is a sufficient number of catch elements, so that several distances can be set. The beam of the second part has a slot extending longitudinally its free end adjacent the catch elements. This permits the end of the beam to be slightly squeezed when inserted in the recess of the first part. When the catch elements of the first and second parts engage, it is no longer possible to easily separate the parts.

BRIEF DESCRIPTION OF THE DRAWINGS

The invention will be explained in more detail by means of the following drawings.

DETAILED DESCRIPTION OF THE INVENTION

Figure 1:
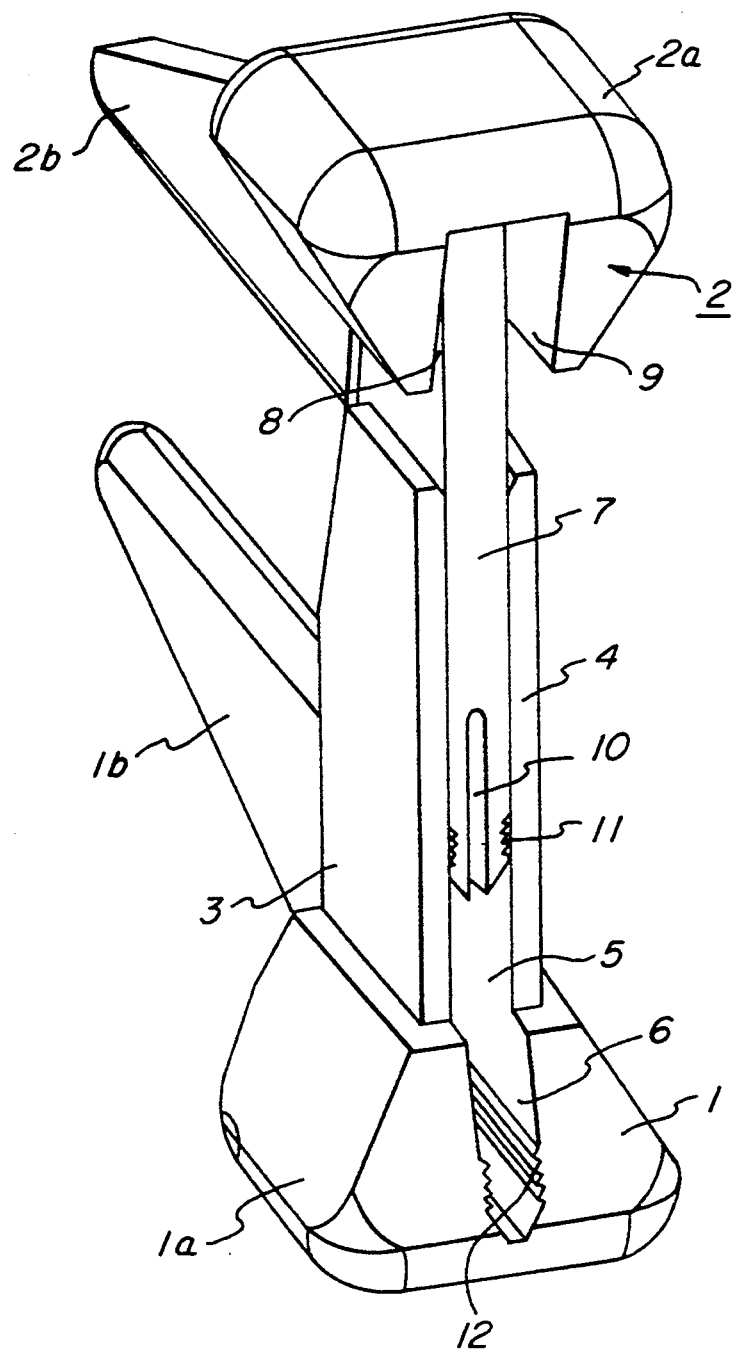
FIGS. 1 and 2 show perspective views of the device in the open position (FIG. 1) and in the closed position (FIG. 2).

The device of the present invention for sealing the end of a heat-shrunk sleeve comprises a first part 1 and a second part 2. Each of the parts 1 and 2 has a head portion 1a or 2a, and an arm 1b or 2b. The arms 1b and 2b are generally parallel to each other in any position. Both parts 1 and 2 have connectors, by means of which parts 1 and 2 can be assembled to form the device of the invention. The connector of the first part 1 has two beams 3 and 4, which form a gap 5 between themselves. The gap 5 extends to a recess 6 in the head portion 1a.

The connector of the second part 2 has a beam 7, which extends from the head portion 2a. Both sides of the base of beam 7 are provided with recesses 8 and 9 in the head portion 2a, whose width is of a size that permits the free ends of beams 3 and 4 to be inserted. The free end of beam 7 has a slot 10 and catch elements 11, which, in the assembled condition, combine with catch elements 12 located in recess 6.

The surface of head portions 1a and 2a has a rounded contour, so that parts 1 and 2 fit well into the hand of the user during installation and sealing of the sleeve end. The opposing surfaces of arms 1b and 2b are also rounded, or have a triangular cross section.

Parts 1 and 2 are preferably manufactured by injection molding a heat resistant plastic resin material, e.g. polyamide, polycarbonate, polyester or by compression molding a synthetic resin. Parts 1 and 2 may be preassembled at the factory to have the assembled relationship shown in FIG. 1, but the catch elements 11 and 12 must be prevented from interacting. To prevent interaction of the preassembled parts, a formed part (not shown), e.g. of corrugated cardboard or polystyrene, can be placed in gap 5 or in recess 6. Alternatively, parts 1 and 2 may be assembled for the first time at the installation site.

Figure 2:
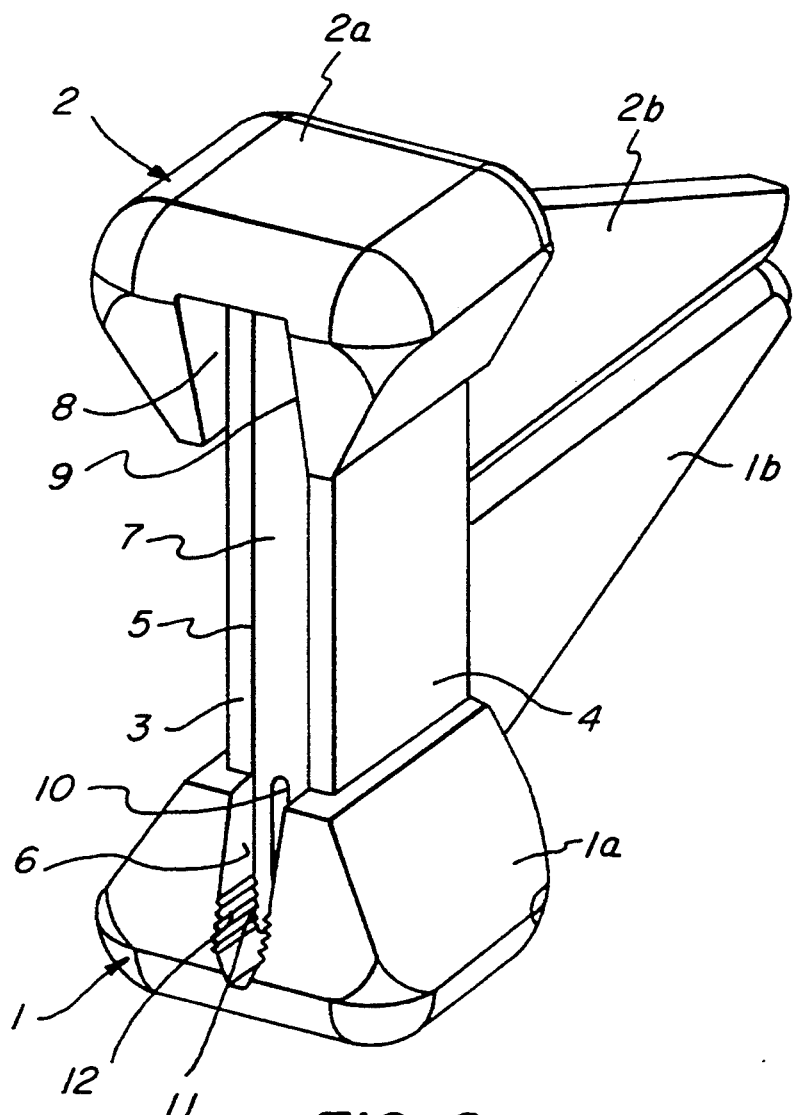

FIG. 2 shows the device in the assembled, i.e. operative, condition. The arms 1b and 2b are located on the outside surface of a heat-shrunk sleeve (not shown) between the branching cables (not shown). Parts 1 and 2 are interlocked by means of catch elements 11 and 12 to hold the parts in assembly.

Thus, it can be seen from the foregoing specification and attached drawings that the present invention provides an effective means for establishing intimate contact of the heat shrinkable material in the area between two closely adjacent members during a heat sealing operation.

The preferred embodiment admirably achieves the objects of the present invention; however, it should be appreciated that departures can be made by those skilled in the art without departing from the spirit and scope of the invention which is limited only by the following claims.

What is claimed is:

1. A device for sealing a heat-shrunk sleeve surrounding branching cables comprising:

first and second parts having two parallel arms which grip the sleeve between the branching cables and keep opposing surfaces of the sleeve in contact with each other between the cables during cooling after heat-shrinking of the sleeve, each of the first and second parts having one of said two parallel arms, a head portion located at the end of its respective arm and a connector protruding from the head portion, the connector of the first part having two beams forming a gap therebetween, the connector of the second part having a single beam located in the gap, the beam of the second part having catch elements at a free end thereof interlocked with catch elements in a recess in the first part so that the distance between the arms can be changed with the arms remaining generally parallel to each other at any distance between them, wherein recesses are provided on both sides of the beam in the head portion of the second part and ends of the beams of the first part are located in the recess of the second part.

2. A device according to claim 1, wherein the recess of the first part is between its two beams and the end of the beam of the second part is located in the recess of the first part.

3. A device according to claim 1, wherein the free end of the beam of the second part has a slot.

4. A device according to claim 1, wherein each of the connectors extends normally to its respective arm.

5. A device for sealing a heat-shrunk sleeve surrounding branching cables comprising:

first and second parts having two parallel arms which grip the sleeve between the branching cables and keep opposing surfaces of the sleeve in contact with each other between the cables during cooling after heat-shrinking of the sleeve, each of the first and second parts having one of said two parallel arms, the first part having two beams forming a gap therebetween, the second part having a single beam located in the gap, the beam of the second part having catch elements at a free end thereof to provide means for interlocking with catch elements in a recess in the first part so that the distance between the arms can be changed with the arms remaining generally parallel to each other at any distance between them.

6. A device according to claim 5, wherein recesses are provided on both sides of the beam in the head portion of the second part and ends of the beams of the first part are located in the recesses of the second part.

7. A device according to claim 6, wherein the recess of the first part is between its two beams and the end of the beam of the second part is located in the recess of the first part.

8. A device according to claim 7, wherein the catch elements in the recess of the first part are gripped by the catch elements located on the free end of the beam of the second part.

9. A device according to claim 8, wherein the free end of the beam of the second part has a slot.

10. A device according to claim 5, wherein the recess of the first part is between its two beams and the end of the beam of the second part is located in the recess of the first part.

11. A device according to claim 10, wherein the catch elements in the recess of the first part are gripped by the catch elements located on the free end of the beam of the second part.

12. A device according to claim 11, wherein the free end of the beam of the second part has a slot.

13. A device according to claim 5, wherein the catch elements in the recess of the first part are gripped by the catch elements located on the free end of the beam of the second part.

14. A device according to claim 13, wherein the free end of the beam of the second part has a slot.

15. A device according to claim 5, wherein the free end of the beam of the second part has a slot.

* * * * *